UNITED STATES PATENT OFFICE 2,324,826

TRIAZINE DERIVATIVES

Gaetano F. D'Alelio, Pittsfield, Mass., assignor to General Electric Company, a corporation of New York No Drawing. Application February 27, 1942,
Serial No. 432,659

16 Claims. (Cl. 260—248)

This invention relates to new chemical compounds and more particularly to triazine derivatives. The invention especially is concerned with the production of new and useful compounds corresponding to the following general formula:

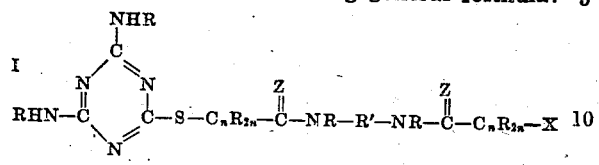

wherein $n$ represents an integer and is at least 1 and not more than 2, Z represents a member of the class consisting of oxygen and sulfur, R represents a member of the class consisting of hydrogen and monovalent hydrocarbon and substituted hydrocarbon radicals, more particularly halo-hydrocarbon radicals, R' represents a member of the class consisting of divalent hydrocarbon and substituted hydrocarbon radicals, more particularly halo-hydrocarbon radicals, and X represents a halogen atom, more particularly chlorine, bromine, fluorine or iodine. These compounds are (diamino triazinyl thio aliphatic-amido or aliphatic-thionoamido) (halogeno aliphatic-amido or aliphatic-thionoamido) derivatives of divalent hydrocarbons.

Illustrative examples of monovalent radicals that R in the above formula may represent are: aliphatic (e. g., methyl, ethyl, propyl, isopropyl, butyl, secondary butyl, isobutyl, butenyl, amyl, isoamyl, hexyl, octyl, methallyl, ethallyl, crotyl, etc., including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, fluorophenyl, iodophenyl, bromotolyl, etc. Preferably R in Formula I is hydrogen. However, there also may be produced in accordance with the present invention compounds such, for instance, as those represented by the general formulas

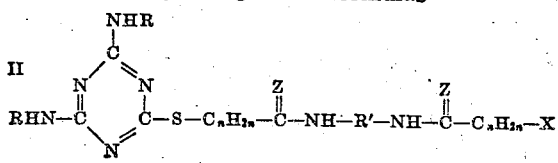

and, more particularly,

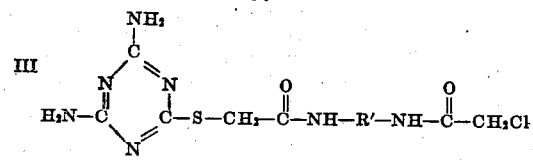

where $n$, Z, R, R' and X have the same meanings as given above with reference to Formula I.

Illustrative examples of divalent radicals that R' in the above formulas may represent are: divalent aliphatic, e. g., ethylene, propylene (trimethylene), propenylene, butylene, isobutylene, pentylene, isopentylene, etc., including divalent cycloaliphatic, e. g., cyclopentylene, cyclopentenylene, cyclohexylene, cyclohexenylene, cycloheptylene, etc.; divalent aromatic, e. g., phenylene, xenylene, naphthylene, etc.; divalent aliphatic-substituted aromatic, e. g., 2,4-tolylene, ethyl 2,5-phenylene, isopropyl 3,4-phenylene, 1-butyl 2,4-naphthylene, etc.; divalent aromatic-substituted aliphatic, e. g., phenylethylene, phenylpropylene, naphthylisobutylene, xylylene, alpha-(4-tolylene) beta'-butyl, etc.; radicals that may be classed either as divalent aliphatic-substituted aromatic or divalent aromatic-substituted aliphatic, e. g., 4,alpha-tolylene, 3,beta-phenyleneethyl, 4,alpha-xylylene, 2,gamma-phenylene-butyl, etc.; and their homologues, as well as those divalent radicals with one or more of their hydrogen atoms replaced by a substituent, e. g., halogeno, amino, acetyl, acetoxy, carboalkoxy, alkoxy, aryloxy, hydroxy, alkyl, alkenyl, etc. Specific examples of substituted divalent radicals are chloroethylene, chloropropylene, bromobutylene, chlorophenylene, chlorotolylene, bromophenylene, chloronaphthylene, bromonaphthylene, bromo 1,4-tolylene, chlorocyclopentylene, chlorocyclopentenylene, carbomethoxyphenylene, ethoxyphenylene, acetophenylene, acetoxyphenylene, bromocyclopentylene, aminophenylene, phenoxyphenylene, methylphenylene (tolylene), allylphenylene, etc. Preferably R' is ethylene, phenylene or tolylene.

The new compounds of this invention may be used, for example, as pharmaceuticals, plasticizers, fungicides, insecticides, as an intermediate in the preparation of dyes and other chemical compounds, for instance as an intermediate in producing derivatives thereof such as ureido, hydrazino, carbamyl, amidine, methylol, etc., derivatives. These new compounds are especially valuable in the preparation of synthetic resinous compositions. Thus, they may be condensed with, for instance, aldehydes, including polymeric aldehydes, hydroxy aldehydes and aldehyde-addition products, to yield condensation products of particular utility in the plastics and coating arts. Such condensation products are more fully described and are specifically claimed in my copending application Serial No. 452,790, filed July 29, 1942, and assigned to the same assignee as the present invention. These new compounds also may be compounded with rubber, both natural and synthetic, to modify the properties of the rubber.

More specific examples of the chemical compounds of this invention are the (diamino s-triazinyl thio acetamido) (halogeno acetamido)-substituted aliphatic hydrocarbons, more particularly the (diamino s-triazinyl thio acetamido) (chloroacetamido) alkanes, e. g., alpha-(diamino s-triazinyl thio acetamido) beta-(chloroacetamido) ethane, alpha-(diamino s-triazinyl thio acetothionoamido) beta-(chloroacetothionoamido) ethane, the (diamino s-triazinyl thio acetamido) (halogeno acetamido)-substituted aromatic hydrocarbons, e. g., the (diamino s-triazinyl thio acetamido) (chloroacetamido) benzenes, the (diamino s-triazinyl thio acetothionoamido) (chloroacetothionoamido) benzenes, the (diamino s-triazinyl thio acetamido) (chloroacetamido) toluenes, etc.

Various methods may be employed to produce the chemical compounds with which this invention is concerned. I prefer to prepare them by effecting reaction between a bis-(halogeno aliphatic-amido)-substituted divalent compound or a bis-(halogeno aliphatic-thionoamido)-substituted divalent compound and a mercapto diamino [(NHR)₂] s-triazine in the presence of a hydrohalide acceptor, the reactants being employed in the ratio of one mol of the mercapto diamino s-triazine per mol of the said substituted divalent compound. Illustrative examples of substituted divalent compounds that may be used, depending on the end-product desired, are:

Bis-(chloroacetamido) ethane, more particularly alpha, beta-bis-(chloroacetamido) ethane
Bis-(chloroacetothionoamido) ethane, more particularly alpha, beta-bis-(chloroacetothionoamido) ethane
Bis-(chloroacetamido) propanes
Bis-(chloroacetothionoamido) propanes
Bis-(chloroacetamido) butanes
Bis-(chloroacetamido) pentanes
Bis-(chloroacetamido) benzenes
Bis-(chloroacetamido) toluenes
Bis-(chloroacetamido) xylenes
Bis-(chloroacetamido) naphthalenes
Bis-(chloroacetamido) octanes
Bis-(beta-chloropropanamido) propanes
Bis-(N-methyl alpha-bromopropanamido) propenes
Bis-(beta-iodopropanamido) butanes
Bis-(alpha-methyl beta-chloro N-isopropyl propanamido) chloroisobutanes
Bis-(alpha-butyl beta-bromo N-ethyl propanamido) pentanes
Bis-(alpha-phenyl beta-chloro octanamido) isopentanes
Bis-(beta-chlorophenyl beta-bromo N-cyclopentyl butanthionoamido) cyclopentanes
Bis-(alpha, alpha-ditolyl beta-chloro propanamido) cyclopentanes
Bis-(alpha-xylyl alpha-bromo N-phenyl butanamido cyclohexanes
Bis-(alpha-chlorotolyl alpha-methyl beta-chloro pentanamido) chlorocyclohexenes
Bis-(N-tolyl chloroacetothionoamido) cycloheptanes
Bis-(beta-bromopropanamido) benzenes
Bis-(beta-chloro N-benzyl 4-pentenamido) biphenyls
Bis-(bromocyclopentyl chloro N-naphthyl acetamido) naphthalenes
Bis-(bromoacetamido) ethane, more particularly alpha, beta-bis-(bromoacetamido) ethane
2,4-bis-(cyclohexenyl bromo acetothionoamido) chlorotoluene
2,5-bis-(beta-phenyl alpha-chloro N-chlorophenyl propanamido) ethylbenzene
3,4-bis-(beta-bromoponamido) propylbenzene
4,4'-bis-(N-bromoethyl chloroacetamido) diphenylmethane
Alpha, gamma-bis-(N-xenyl chloroacetamido) phenylpropane
Alpha, alpha'-bis-(beta''-chloroheptanthionoamido) xylene
2,4-bis-(cyclopentenyl chloro N-aminophenyl acetamido 1-isobutyl naphthalene
Alpha, beta-bis-(omega'-chloro alpha'-bromo N-butylphenyl pentanamido) phenylethane
Bis-(bromoacetamido) propanes
Bis-(bromoacetamido) benzenes Illustrative examples of diamino mercapto s-triazines that may be employed, depending upon the particular end-product sought, are:

2-mercapto 4,6-diamino s-triazine (4-mercapto 2,6-diamino s-triazine; 6-mercapto 2,4-diamino s-triazine)
2-mercapto 4,6-di-(methylamino) s-triazine
2-mercapto 4,6-di-(anilino) s-triazine
2-mercapto 4-amino 6-ethylamino s-triazine
2-mercapto 4,6-di-(propylamino) s-triazine
2-mercapto 4-allylamino 6-butylamino s-triazine
2-mercapto 4-isobutylamino 6-cyclopentylamino s-triazine
2-mercapto 4-(3'-butenylamino) 6-isopropylamino s-triazine
2-mercapto 4-pentylamino 6-cyclohexylamino s-triazine
2-mercapto 4-n-hexylamino 6-xenylamino s-triazine
2-mercapto 4-cyclohexenylamido 6-naphthylamino s-triazine
2-mercapto 4-chlorocyclopentylamino 6-toluido s-triazine
2-mercapto 4-bromotoluido 6-benzylamino s-triazine
2-mercapto 4-phenylchloroethylamino 6-phenethylamino s-triazine
2-mercapto 4-chloroanilino 6-ethylphenylamino s-triazine
2-mercapto 4-cycloheptylamino 6-isopropylphenylamino s-triazine
2-mercapto 4-isopropylanilino 6-phenylpropylamino s-triazine
2-mercapto 4-dichloroanilino 6-chloroethylamino s-triazine
2-mercapto 4-amino 6-bromoethylamino s-triazine
2-mercapto 4-amino 6-methylamino s-triazine
2-mercapto 4-amino 6-ethylamino s-triazine
2-mercapto 4-aminoanilino 6-ethylphenylamino s-triazine
2-mercapto 4-amino 6-benzylamino s-triazine
2-mercapto 4-amino 6-xenylamino s-triazine
2-mercapto 4-amino 6-propylamino s-triazine
2-mercapto 4-amino 6-chloroethylamino s-triazine
2-mercapto 4-amino 6-naphthylamino s-triazine Various hydrohalide acceptors may be employed. I prefer to use a hydrohalide acceptor that will react with the mercapto triazine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino s-triazine and the bis-(halogeno aliphatic-amido) or bis-(halogeno aliphatic-thionoamido) substituted divalent compound may be carried out in any suitable manner, but preferably is effected in the presence of a suitable solvent or mixture of solvents. Although various solvents and solvent mixtures may be employed, I prefer to use water or a mixture of water and alcohol. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

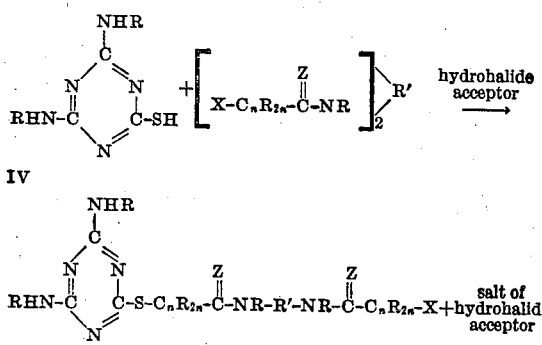

In the above equation $n$, $Z$, $R$, $R'$ and $X$ have the same meanings as given above with reference to Formula I.

In order that those skilled in the art better may understand how the present invention may be carried into effect, the following illustrative examples are given. All parts are by weight.

*Example 1*

This example illustrates the preparation of alpha-(diamino s-triazinyl thio acetamido) beta-(chloroacetamido) ethane, the formula for which is

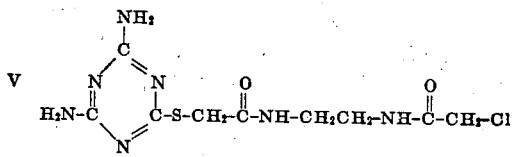

| | Parts |
|---|---|
| Thioammeline | 71.5 |
| Alpha, beta-bis-(chloroacetamido) ethane | 106.5 |
| Sodium hydroxide | 20.0 |

The bis-(chloroacetamido) ethane was partially dissolved in 1,000 parts absolute ethyl alcohol (commercial grade). At the same time another solution was prepared by dissolving the sodium hydroxide and the thioammeline (mercapto diamino s-triazine) in 500 parts water. This resulted in the formation of the sodium salt of the thioammeline. The solution of the thioammeline in the form of its sodium salt was added to the alcoholic solution of the bis-(chloroacetamido) ethane, thereby avoiding the formation of a bis-(diamino triazinyl thio acetamido) ethane since an excess of bis-(chloroacetamido) ethane was present during the reaction period. This procedure assured the production of the monosubstituted s-triazine. The mixed solutions were heated for 30 minutes at about 85° C. with constant stirring and then, while continuing the stirring, the reaction mass was allowed to stand at room temperature for several hours. A slow precipitation of solid matter took place. This precipitate comprising alpha-(diamino s-triazinyl thio acetamido) beta-(chloroacetamido) ethane was removed by filtration, washed free of soluble salts, specifically sodium chloride, and then dried at 70° C.

*Example 2*

Alpha-(diamino s-triazinyl thio acetothionoamido) beta-(chloroacetothionoamido) ethane is produced in essentially the same manner as described under Example 1 with the exception that, instead of alpha, beta-bis-(chloroacetamido) ethane, an equivalent amount of alpha, beta-bis-(chloroacetothionoamido) ethane is employed.

*Example 3*

A (diamino s-triazinyl thio acetamido) (chloroacetamido) benzene is produced in essentially the same manner as described under Example 1 with the exception that, instead of alpha, beta-bis-(chloroacetamido) ethane, an equivalent amount of a bis-(chloroacetamido) benzene is used.

*Example 4*

A (diamino s-triazinyl thio acetamido) (chloroacetamido) toluene is prepared in essentially the same manner as described under Example 1 with the exception that, instead of alpha, beta-bis-(chloroacetamido) ethane, an equivalent amount of a bis-(chloroacetamido) toluene is employed.

*Example 5*

Alpha-(diamino s-triazinyl thio acetamido) beta-(bromoacetamido) ethane is produced in essentially the same manner as described under Example 1 with the exception that, instead of alpha, beta-bis-(chloroacetamido) ethane, an equivalent amount of alpha, beta-bis-(bromoacetamido) ethane is used.

Other examples of the new chemical compounds of this invention are listed below:

(Diamino s-triazinyl thio acetamido) (chloroacetamido) propanes (Diamino s-triazinyl thio acetothionoamido) (bromoacetothionoamido) propanes (Diamino s-triazinyl thio acetamido) (chloroacetamido) butanes (Diamino s-triazinyl thio acetamido) (bromoacetamido) pentanes (Diamino s-triazinyl thio acetamido) (bromoacetamido) benzenes (Diamino s-triazinyl thio acetamido) (bromoacetamido) toluenes (Diamino s-triazinyl thio acetamido) (chloroacetamido) xylenes (Diamino s-triazinyl thio acetamido) (iodoacetamido) benzenes (Diamino s-triazinyl thio acetamido) (chloroacetamido) naphthalenes (Diamino s-triazinyl thio acetamido) (chloroacetamido) chlorobenzenes (Diamino s-triazinyl thio acetamido) (chloroacetamido) octanes (Diamino s-triazinyl thio acetamido) (bromoacetamido) bromobutanes (Diamino s-triazinyl thio acetamido) (chloroacetamido) chloronaphthalenes
(Diamino s-triazinyl thio acetamido) (chloroacetamido) ethylbenzenes
(Diamino s-triazinyl thio acetamido) (bromoacetamido) cyclopentanes
Alpha-(diamino s-triazinyl alpha'-thio propanamido) beta-(alpha''-chloro propanamido) ethane
Alpha-(diamino s-triazinyl beta'-thio propanamido (beta-(beta''-chloro propanamido) ethane
Alpha-(diamino s-triazinyl alpha'-thio propanthionoamido) beta-(alpha''-chloro propanthionoamido) ethane
Alpha-(diamino s-triazinyl beta'-thio propanthionoamido) beta-(beta''-chloropropanthionoamido) ethane
(Diamino s-triazinyl alpha-thio propanamido) (alpha'-bromo propanamido) propanes
(Diamino s-triazinyl beta-thio propanamido) (beta'-bromo propanamido) propanes
(Diamino s-triazinyl alpha-thio propanamido) (alpha'-chloro propanamido) benzenes
(Diamino s-triazinyl beta-thio propanamido) (beta'-iodo propanamido) toluenes
(Diamino s-triazinyl alpha-thio propanamido) (alpha'-chloro propanamido) naphthalenes
(Diamino s-triazinyl beta-thio propanamido) (beta'-chloro propanamido) chlorobenzenes
(Diamino s-triazinyl alpha-thio propanamido) (alpha'-fluoro propanamido) octanes
Alpha-(4,6-di-[methylamino] s-triazinyl-2 thio methylacetamido) gamma-(bromo methyl acetamido) propene
(4,6-di-[anilino] s-triazinyl-2 beta-thio alphamethyl propanamido) (alpha'-methyl beta'-chloro propanamido) chloroisobutanes
(4-ethylamino 6-amino s-triazinyl-2 beta-thio alpha-butyl N-ethyl propanamido) (alpha'-butyl N'-ethyl beta'-chloro propanamido) pentanes
(4,6-di-[propylamino] s-triazinyl-2 beta-thio alpha-phenyl beta-pentyl propanamido) (alpha'-phenyl beta'- pentyl beta'-chloro propanamido) isopentanes
(4-allylamino 6-butylamino s-triazinyl-2 beta-thio beta-methyl beta-chlorophenyl N-cyclopentyl propanthionoamido) (beta'-methyl beta'-chlorophenyl N'-cyclopentyl beta'-bromo propanthionoamido) cyclopentanes
(4-isobutylamino 6-cyclopentylamino s-triazinyl-2 beta-thio alpha, alpha-ditolyl propanamido) (alpha', alpha'-ditolyl beta'-chloro propanamido) cyclopentenes
(4-[3'-butenylamino] 6-isopropylamino s-triazinyl-2 beta-thio alpha, beta, beta-trimethyl alpha-chlorotolyl propanamido) (alpha', beta', beta'-trimethyl alpha'-chlorotolyl beta'-bromo propanamido) chlorocyclohexanes
(4-isopentylamino 6-cyclohexylamino s-triazinyl-2 thio N-tolyl acetothionoamido) (N'-tolyl chloro acetothionoamido) cycloheptanes
(4-hexylamino 6-xenylamino s-triazinyl-2 beta-thio propanamido) (beta-bromo propanamido) benzenes
4-cyclohexenylamino 6-naphthylamino s-triazinyl-2 beta-thio beta-vinyl N-benzyl propanamido) (beta'-vinyl beta'-chloro N'-benzyl propanamido) biphenyls
(4-chlorocyclopentylamino 6-toluido s-triazinyl-2 thio bromocyclopentyl N-naphthyl acetamido) bromocyclopentyl N'-naphthyl bromo acetamido) naphthalenes
4-(4'-bromotoluido 6'-benzylamino s-triazinyl-2' thio cyclohexenyl acetothionoamido) 2-(cyclohexenyl chloro acetothionoamido) chlorotoluene
4-(4'-phenylchloroethylamino 6'-phenethylamino s-triazinyl-2' beta-thio propanamido) 3-(beta'-iodo propanamido) ethylbenzene
(4-chloroanilino 6-ethylanilino s-triazinyl-2 thio N-bromoethyl acetamido) (N'-bromoethyl chloro acetamido) diphenylmethanes
4-(4'-cycloheptylamino 6'-propylanilino s-triazinyl-2' thio cyclopentenyl N-phenyl acetamido) 2-(cyclopentenyl N'-phenyl chloro acetamido) 1-butylnaphthalene
Alpha-(4-propylanilino 6-phenylpropylamino s-triazinyl-2 thio chloropropyl N-butylphenyl acetamido) beta-(chloropropyl N'-butylphenyl chloro acetamido) alpha-phenylethane
Alpha-(4-dichloroanilino 6-chloroethylamino s-triazinyl-2 thio N-xenyl acetamido) gamma-(N'-xenyl chloro acetamido) alpha-phenylpropane
Alpha-(4-amino 6-bromoethylamino s-triazinyl-2 beta''-thio beta''-butyl propanthionoamido) alpha'-(beta'''-butyl beta'''-chloro propanthionoamido) xylene It will be understood, of course, by those skilled in the art that, in those compounds listed above that are generically named, the substituent groupings may be attached to any two positions of the divalent hydrocarbon or halo-hydrocarbon nucleus.

In a manner similar to that described above with particular reference to the diamino [(—NHR)$_2$] s-triazinyl derivatives, corresponding derivatives of the asymmetrical and vicinal triazines may be prepared. It also will be understood by those skilled in the art from the foregoing description of the preparation of a triazine monosulfide that similar compounds may be prepared in which two or three sulfur atoms are attached directly to a carbon atom of the triazine nucleus.

What I claim as new and desire to secure by Letters Patent of the United States is:

1. Chemical compounds corresponding to the general formula $$\text{RHN}-\overset{N}{\underset{N}{\overset{\|}{C}}}\overset{\overset{NHR}{|}}{\underset{}{C}}\overset{}{\underset{N}{\|}}\overset{}{C}-S-C_nR_{2n}-\overset{Z}{\overset{\|}{C}}-NR-R'-NR-\overset{Z}{\overset{\|}{C}}-C_nR_{2n}-X$$

wherein $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, R' represents a member of the class consisting of divalent hydrocarbon and halo-hydrocarbon radicals, and X represents a halogen atom.

2. Chemical compounds as in claim 1 wherein R represents a hydrogen atom.

3. Chemical compounds as in claim 1 wherein X represents a chlorine atom.

4. Chemical compounds as in claim 1 wherein R represents hydrogen, Z represents a member of the class consisting of oxygen and sulfur, and $n$ is 1.

5. Chemical compounds as in claim 1 wherein R represents hydrogen, Z represents a member of the class consisting of oxygen and sulfur, $n$ is 1, and X represents a chlorine atom.

6. Chemical compounds corresponding to the general formula

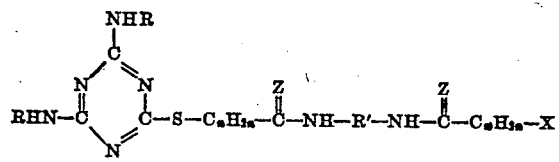

wherein $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, R' represents a member of the class consisting of divalent hydrocarbon and halo-hydrocarbon radicals, and X represents a halogen atom.

7. Chemical compounds corresponding to the general formula

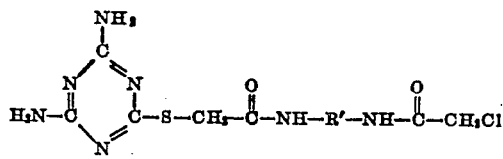

where R' represents a member of the class consisting of divalent hydrocarbon and halo-hydrocarbon radicals.

8. A (diamino s-triazinyl thio acetamido) (halogeno acetamido)-substituted aliphatic hydrocarbon.

9. A (diamino s-triazinyl thio acetamido) (halogeno acetamido) alkane.

10. Alpha-(diamino s-triazinyl thio acetamido) beta-(chloroacetamido) ethane.

11. A (diamino s-triazinyl thio acetamido) (halogeno acetamido)-substituted aromatic hydrocarbon.

12. A (diamino s-triazinyl thio acetamido) (halogeno acetamido) benzene.

13. A (diamino s-triazinyl thio acetamido) (halogeno acetamido) toluene.

14. The method of preparing chemical compounds corresponding to the general formula

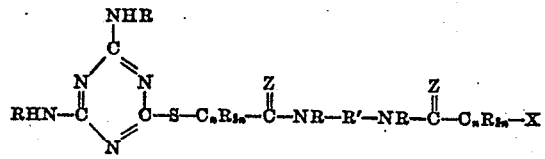

wherein $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, R' represents a member of the class consisting of divalent hydrocarbon and halo-hydrocarbon radicals, and X represents a halogen atom, said method comprising effecting reaction, in the presence of a hydrohalide acceptor, between equimolecular proportions of (1) a mercapto triazine corresponding to the general formula

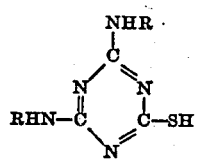

where R has the meaning above given, and (2) a compound corresponding to the general formula

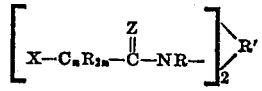

where X represents halogen, and $n$, Z, R and R' have the meanings above given.

15. A method as in claim 14 wherein the hydrohalide acceptor is an alkali-metal hydroxide.

16. A method of preparing alpha-(diamino s-triazinyl thio acetamido) beta-(chloroacetamido) ethane which comprises effecting reaction, in the presence of a hydrohalide acceptor, between equimolecular proportions of thioammeline and alpha, beta-bis-(chloroacetamido) ethane.

GAETANO F. D'ALELIO.

CERTIFICATE OF CORRECTION.

Patent No. 2,324,826.                  July 20, 1943.

GAETANO F. D'ALELIO.

It is hereby certified that error appears in the printed specification of the above numbered patent requiring correction as follows: Page 2, first column, line 68, after the syllable "amido" insert a closing parenthesis; and second column, line 9, for "bromoponamido" read --bromopropanamido--; line 17, after "acetamido" insert a closing parenthesis; line 42, for "4-cyclohexenylamido" read --4-cyclohexenylamino--; page 3, first column, line 30, after that portion of the formula reading "X-$C_nR_{2n}$-$\overset{\overset{Z}{\|}}{C}$-NR" and before the bracket insert a single bond; page 4, first column, line 11, for "amido (beta-" read -- amido) beta- --; line 67, before "4-cyclohexenylamino" insert an opening parenthesis; line 74, before "bromocyclopentyl" insert an opening parenthesis; and that the said Letters Patent should be read with this correction therein that the same may conform to the record of the case in the Patent Office.

Signed and sealed this 21st day of September, A. D. 1943.

(Seal)                             Henry Van Arsdale,
                                      Acting Commissioner of Patents.